Patented July 25, 1939

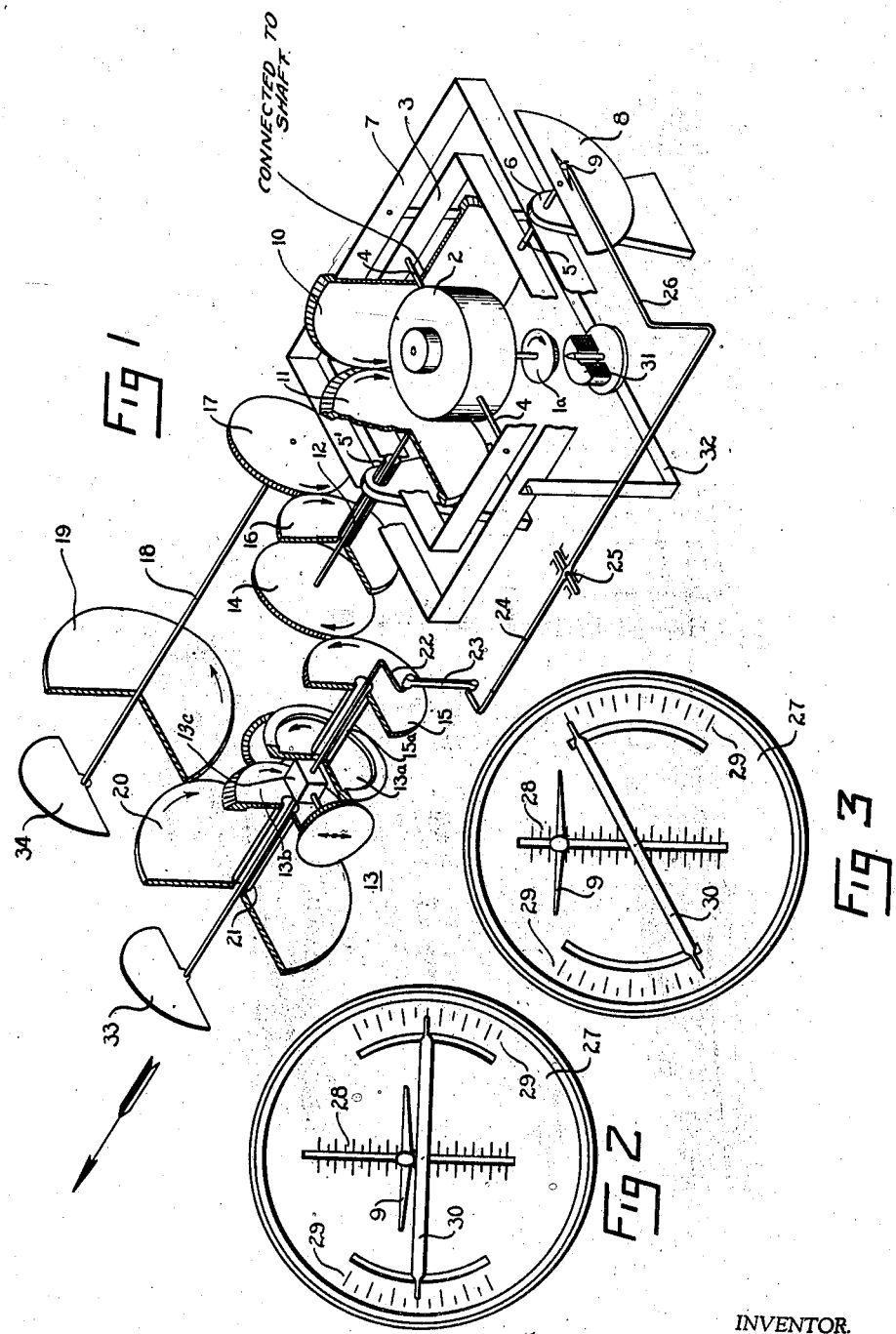

2,167,422

UNITED STATES PATENT OFFICE 2,167,422

APPARATUS FOR ESTABLISHING AN ARTIFICIAL HORIZON

Heinrich Langgässer, Berlin-Grunewald, Germany, assignor to Siemens Apparate und Maschinen Gesellschaft mit beschränkter Haftung, Berlin, Germany, a corporation of Germany Application October 12, 1937, Serial No. 168,667
In Germany July 29, 1936

7 Claims. (Cl. 33—204)

This invention relates to apparatus for establishing an artificial horizon and for indicating the attitude of a vehicle relative thereto, and particularly to apparatus for simultaneously indicating the longitudinal and transverse inclinations of aircraft relative to said horizon.

The problem of providing means to orient an aircraft flying in fog, or clouds with an obscured horizon is one of long standing. Devices have heretofore been proposed for artificially indicating the position of aircraft relative to the horizon, comprising means which necessitated the exertion of continuous mental effort to interpret the actual attitude of the plane from the indications of the device.

One of the objects of the present invention is to provide novel means for indicating the attitude of an aircraft relative to an artificial horizon.

Another object of the invention is to provide novel and easily interpretable artificial horizon indicating means from which the actual attitude of the craft relative thereto may be read at a glance.

Another object of this invention is to provide novel means for indicating the attitude of a vehicle such as an aircraft relative to an artificial horizon in such a manner that the image produced will be similar to that observed by a pilot in flight.

A further object is to provide novel means for establishing an artificial horizon from which both transverse and longitudinal inclinations of an aircraft may be easily read upon a suitably calibrated scale.

Another object is to provide novel means for indicating the attitude of an aircraft relative to an artificial horizon wherein a single gyroscope may be employed for establishing both transverse and longitudinal inclinations.

An additional object is to provide novel means for instantaneously indicating the climbing or descending angle of an aircraft.

Another object is to provide novel means for producing an artificial horizon and indicating the attitude of an aircraft relative thereto, wherein the indications of longitudinal and transverse inclinations may be employed to operate the aircraft control means particularly in automatic control devices for such vehicles.

The above and further objects and novel features of the invention will more fully appear from the following detailed description when the same is read in connection with the accompanying drawing. It is to be expressly understood, however, that the drawing is for the purpose of illustration only and are not intended to define the limits of the invention, reference being had for this latter purpose to the appended claims.

In the drawing,

Fig. 1 is a schematic diagram in perspective illustrating one embodiment of the present invention;

Fig. 2 is a view of one form of the indicating face of the present invention with the parts thereof at the zero position; and, Fig. 3 is a view of one form of the indicating face of the present device with the parts thereof at a definite operating position.

The form of the invention illustrated in the accompanying drawing, by way of example, is a device for indicating the attitude of an aircraft, relative to an artificial horizon and comprises a single gyroscope which may be driven by suitable means, as by an air turbine, mounted for rotation in a horizontal plane in a Cardan ring upon a transverse shaft, said ring, in turn, being mounted on the vehicle upon a longitudinal shaft. The action of the gyroscope, by means of the former shaft, establishes the longitudinal inclinations and by means of the latter shaft the transverse inclinations of said vehicle. Suitable means are provided for operatively connecting the apparatus to devices (not shown) for the automatic control of the aircraft. In a device of this character, the longitudinal inclination indications are influenced by the movements of the above-mentioned transverse shaft which is free not only to rotate relative to said ring but to revolve relatively about the longitudinal axis of the vehicle. The effect of the revolving motion of this shaft must be eliminated since it is a measure only of the transverse and not the longitudinal inclination. Suitable compensating means are provided to eliminate this effect.

In the form illustrated in Fig. 1, novel means are provided for establishing an artificial horizon and for simultaneously indicating the longitudinal and transverse inclinations of an aircraft, relative thereto, said means comprising a gyroscope member which is rotated in a horizontal plane by suitable means as by induction motor means (not shown), for example, and is enclosed in a housing 2, it being assumed that the aircraft is headed in the direction of the arrow. The gyroscope member thus establishes the true vertical and provides the reference plane for the measurement of the above-mentioned inclinations. The housing 2 is rotatably mounted upon a Cardan ring 3 by means of a shaft 4 which is parallel to the transverse axis of the aircraft. Cardan ring 3 is, in turn, mounted upon shaft 5, 5' which rotates upon arms 6, 6 which are firmly attached to the aircraft. For a purpose to be hereafter explained, shaft 5 serves as a support for the movably mounted frame member 7. The indication of the transverse inclination of the aircraft is effected by means of a semi-circular plate 8 which is centrally attached to the outer extremity of shaft 5 and serves as a symbol of the natural horizon. Vehicle indicating means comprising a miniature transverse silhouette 9 of an aircraft is suspended adjacent to card 8, in a manner to more fully appear hereinafter, such that the transverse inclination of said silhouette relative to said artificial horizon is obvious at a glance when the aircraft turns upon its longitudinal axis and rotates relative to the Cardan ring 3, shaft 5 and plate 8.

Novel means are provided for indicating the longitudinal inclination of the aircraft simultaneously with the transverse inclination comprising a gear train and differential which transmit the relative rotation of the transverse shaft 4 to a linkage, which displaces the silhouette 9, above or below the edge symbolizing the horizon, an amount proportional to said longitudinal inclination. The gear train comprises a bevel gear 10, attached to shaft 4, which meshes with a bevel gear 11 which, in turn, is attached to a shaft 12 which rotates within hollow shaft 5' and communicates the rotation of shaft 12 to a sun gear 13a of a differential 13 by means of a spur gear 14 upon shaft 12 which meshes at a ratio of 1:1 with a gear 15 upon a hollow shaft 15a attached to said sun gear. It is seen that bevel 11 with the connected gear train and differential will be rotated by both the rotation of gear 10 with shaft 4 and by the revolution of gear 10 about the longitudinal shaft 5. Since the latter revolving motion is caused by, and is a measure of, the transverse inclination only of the aircraft, it is necessary to compensate for this effect upon bevel 11 in order to prevent the algebraic addition of the transverse to the longitudinal inclination.

Compensating means for said revolving movement are constituted by a gear train which transmits the transverse inclination from shaft 5' to the opposite sun gear 13b of the differential 13 such that the effect of said revolution is cancelled therein. The compensating gear train comprises a spur gear 16 fixed upon shaft 5' which meshes at a ratio of 1:1 with a spur gear 17 upon shaft 18. Another spur gear 19 attached to the latter shaft meshes also at a ratio of 1:1 with a gear 20 rigidly attached to a hollow shaft 21 which is in turn affixed to side 13b of differential 13. Consequently, the spider 13c of said differential will rotate in accordance with the longitudinal inclination only.

A linkage is provided for displacing the silhouette 9 above or below the artificial horizon 8, in accordance with the longitudinal inclination or the rotation of spider 13c, comprising a crank arm 22, attached to said spider which, by means of a rod 23, moves a lever arm 24 rotatably mounted at 25. The aircraft silhouette 9 is attached to lever 24 by means of an arm 26 and moves over plate 8 as above set forth.

Novel means are provided for enabling the pilot to read the instantaneous values of the longitudinal and transverse inclinations, comprising a dial 27 which is illustrated in Figs. 2 and 3 and is calibrated in a vertical scale 28 for longitudinal inclination and in scale 29 for transverse inclination. Figs. 2 and 3 are examples of the relative positions of the indicating members 8 and 9 as shown in Fig. 1. However, in said examples, the horizon is constituted by a rod or pointer 30 which corresponds to plate 8 of Fig. 1, and is attached to shaft 5 in a manner analogous to said plate. The relative position of the aircraft and horizon is seen in Fig. 2 when both inclinations are zero. Fig. 3 illustrates the indication when the aircraft is both longitudinally and transversely inclined.

The gyroscope 1 of the present invention is mounted astatically with the axis thereof tending to maintain its position in space as long as it is not excited by momentary disturbances which may cause precession. Such momentary disturbances cannot be entirely eliminated, for example, a precessing moment may be produced by bearing friction which will cause the axis of the gyroscope to wander from its normal position. Means are provided for counteracting such tendencies comprising, for example, an electro-magnet 31 connected to a suitable source of electric energy and mounted upon a member 32 which, in turn, is pivotally mounted upon the movable frame member 7. The magnet 31 therefore is suspended in such a manner that it is free to follow directly beneath the center of the rotor of the gyroscope 1 regardless of the inclinations of the vehicle, and when said magnet is energized will attract the member 1a attached to the lower end of the rotating shaft of said gyroscope, thus counteracting any wandering tendencies of said shaft.

Means are provided for transmitting to appropriate apparatus (not shown) the values of longitudinal and transverse inclination for automatically controlling the vehicle, comprising plates 33 and 34 attached to shafts 13c and 18, respectively, which indicate respectively said longitudinal and transverse inclinations.

In operation, assuming the gyroscope 1 is rotating about its vertical axis and that the aircraft is in a climbing position, said gyroscope, due to its mounting, will tend to remain in the vertical. This tendency will cause a relative rotation of bevel gears 10 and 11 which will be communicated to a sun gear of differential 13 by means of spur gears 14 and 15. Since the opposite sun gear of said differential is held stationary, the spider 13c will move in accordance with said relative rotation only which is a measure of the longitudinal inclination. The crank 22 attached to spider 13c will be moved down by the spider rotation and by means of lever 24 will move the silhouette 9 attached thereto upwards above the artificial horizon 8. The amount of this upward displacement is a measure of the longitudinal inclination and may be read as in Fig. 3 upon the vertical scale 28. Assuming now that the aircraft becomes transversely inclined such that the right wing is dipped, the gyroscope will hold shaft 5, 5' and semicircular plate 8 stationary in such a manner that the upper edge of said plate will symbolize the true horizon. The silhouette 9 of the aircraft is suspended adjacent the artificial horizon 8 as above set forth such that the wings thereof are at all times parallel to the wings of the aircraft. Therefore, the transverse inclination to the right will immediately be indicated by a corresponding relative movement of plate 8, or pointer 30, from its zero position and also by a relative inclination of said silhouette and artificial horizon. The transverse inclination will also cause bevel gear 10 to relatively revolve about the axis of, and to rotate gear 11. This rotation caused by the transverse inclination alone will introduce a false indication into longitudinal inclination and accordingly is compensated for by transmitting a counteracting equal and opposite rotation to the differential 13.

There is thus provided a novel device for indicating the attitude of a vehicle, such as an aircraft, relative to an artificial horizon and which is adapted for simultaneously indicating both transverse and longitudinal inclinations of said vehicle in such a manner that the image produced is easily interpreted and similar to the actual conditions as observed, for example, by a pilot in flight. The apparatus is also adapted for compact construction, is of light weight and may be easily installed within a limited space.

Although only one embodiment of the invention has been illustrated and described in detail, it is to be expressly understood that the same is not limited thereto. For example, in the form shown, the silhouette 9 is movably mounted upon a lever arm 24; however, this construction may be changed so that a suitable gear train and rack moves said silhouette; also the gear ratios may be changed to achieve any desired degree of accuracy. The apparatus instead of indicating the attitude of an aircraft is adapted for similar use on submarines. Various changes may be made in the design and arrangement of parts illustrated without departing from the spirit and scope of the invention as the same will now be understood by those skilled in the art. For a definition of the limits of the invention, reference will be had to the appended claims.

What is claimed is:

1. In apparatus of the class described, a gyroscope, a mounting therefor comprising a transverse shaft, a gear attached to said shaft, a Cardan ring carrying said shaft and a longitudinal shaft for mounting said ring, a gear fixed upon said longitudinal shaft, a gear pivoted upon an axis concentric with said longitudinal shaft and meshing with said gear attached to said transverse shaft, a differential, a sun gear of said differential being controlled by said longitudinally concentric gear, a second sun gear of said differential being controlled by said gear fixed to said longitudinal shaft, a spider of said differential, indicating means forming a horizontal datum, and vehicle simulating means displaceable vertically relative to said plane by and in accordance with the movements of said spider.

2. In a device of the character described, a gyroscope mounted for three degrees of freedom about mutually perpendicular transverse and longitudinal axes, an indicator, gear means rotatable with the gyroscope about said transverse axis, gear means rotatable with the gyroscope about said longitudinal axis, and means controlled by both said gear means for actuating said indicator including means responsive to one of said rotations for counter-acting the effect of said rotation upon said indicator.

3. An artificial horizon for a craft, comprising a gyro element proper, a gimbal ring within which said element is pivoted and a normally horizontal transverse axis, means mounting said ring on a fore and aft axis, an horizon element, a gear fixed to rotate with the gyro about said transverse axis, vehicle simulating means mounted for movement over said horizon element, means driven by said gear for actuation of said vehicle simulating means, and means controlled by relative angular movement between said ring and the craft for modifying the actuation of said vehicle representing element whereby the position of said element is indicative of the pitch only of said craft.

4. An artificial horizon for a craft, comprising a gyro vertical, a gimbal ring within which said gyro vertical is pivoted on a normally horizontal transverse axis, a fixed frame on which said gimbal is mounted and a fore and aft axis, a transversely extending vertically movable indicator representing an aircraft or part thereof at the face of the instrument, and means connecting said indicator with said gyroscope for movement relative to the craft about said transverse axis for climb and dive only of said aircraft, said means including a gear on said transverse axis, differential means having a side actuated by said gear, and means responsive to the banking of said craft actuating another side of said differential means.

5. In an artificial horizon for a craft, a gyro, means mounting said gyro for relative rotation about a pair of mutually normal horizontal support axes, a normally horizontal indicator representing the aircraft at the face of the horizon and relatively movable with respect to the craft upon rolling or banking only thereof, a second normally horizontal indicator, a differential assembly, and means cooperating with said gyroscope and relatively moving said second indicator with respect to the craft upon pitching thereof only, said means including means actuating one element of said differential assembly upon relative rotation of said gyro about one of said support axes, and means actuating another element of said differential assembly upon relative rotation of said gyro about the other of said support axes.

6. In an artificial horizon for a craft, a universally mounted gyro vertical, a normally horizontal indicator representing the aircraft at the reading face of the horizon, and means coacting with said gyroscope for relative movement of said indicator and craft upon pitching only, said means including a differential gear train, a part of said train being controlled by relative inclination of said gyroscope and craft about an axis transverse thereof, and another part of said train being controlled by relative inclination of said gyroscope and craft about an axis longitudinal thereof.

7. In an artificial horizon for aircraft or the like, a gyroscope, means universally mounting said gyroscope including a fore and aft axis therefor, a normally horizontal indicator at the face of the horizon, means cooperating with said gyroscope for relatively moving said indicator and craft upon pitching only, said means including a gear train between said gyroscope and said indicator whereby the relative motion between said craft and gyroscope may be amplified, a dial mounted for movement with said craft and in cooperative position with said indicator, and a second normally horizontal indicator mounted for movement over said dial, said second indicator being directly attached to the fore and aft axis of said gyroscope.

HEINRICH LANGGÄSSER.